US008656767B2

(12) United States Patent
Chebli et al.

(10) Patent No.: US 8,656,767 B2
(45) Date of Patent: Feb. 25, 2014

(54) FAST TRANSFER TIRE WORK STATION

(75) Inventors: Adib T. Chebli, Greer, SC (US); Metodi L. Ikonomov, Moore, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 286 days.

(21) Appl. No.: 13/381,136

(22) PCT Filed: Jun. 30, 2009

(86) PCT No.: PCT/US2009/049159
§ 371 (c)(1),
(2), (4) Date: Dec. 28, 2011

(87) PCT Pub. No.: WO2011/002444
PCT Pub. Date: Jan. 6, 2011

(65) Prior Publication Data
US 2012/0107073 A1 May 3, 2012

(51) Int. Cl.
*G01M 17/02* (2006.01)
*B60C 25/00* (2006.01)

(52) U.S. Cl.
USPC .............................................. 73/146; 157/1.1

(58) Field of Classification Search
USPC .................................................. 73/146–146.8
See application file for complete search history.

(56) References Cited

U.S. PATENT DOCUMENTS

| 1,378,582 | A | 5/1921 | Chipps |
|---|---|---|---|
| 2,347,311 | A | 4/1944 | Branick |
| 2,855,180 | A | 10/1958 | Douglass |
| 2,895,711 | A | 7/1959 | Branick |
| 3,830,469 | A | 8/1974 | Oaks, Jr. |
| 4,160,537 | A | 7/1979 | Severson |
| 4,169,373 | A | 10/1979 | Clark et al. |
| 4,293,120 | A | 10/1981 | Robins |
| 4,678,163 | A | 7/1987 | Hjorth-Hansen |
| 4,977,586 | A | 12/1990 | Curry |
| 5,165,273 | A | 11/1992 | Church |
| 5,460,036 | A * | 10/1995 | Church ........................ 73/146 |
| 6,067,849 | A * | 5/2000 | Church ........................ 73/146 |
| 6,382,644 | B1 | 5/2002 | Rawlings |
| 7,076,876 | B2 | 7/2006 | Baumgartner et al. |

(Continued)

FOREIGN PATENT DOCUMENTS

| EP | 1 392 531 B1 | 4/2008 |
|---|---|---|
| FR | 2 824 782 A1 | 11/2002 |

(Continued)

OTHER PUBLICATIONS

PCT/US2009/049159 International Search Report and Written Opinion dated Aug. 7, 2009, 7pgs.

(Continued)

*Primary Examiner* — Andre Allen
(74) *Attorney, Agent, or Firm* — Hahn Loeser & Parks LLP

(57) ABSTRACT

A tire work station and system for selectively holding a tire having work performed thereon in a side orientation or a front orientation. The tire work station comprises a work platform mounted to a vertically adjustable pedestal having a first support system and a second support system. The first support system comprising a pair of tread rollers inclined at a first inclined angle A1 and further forming a second angle A2 with a pair of sidewall rollers. The sidewall rollers spaced apart to define a passageway for the tire in its front orientation. The second support system mounted between the pair of tread rollers, comprising a tread support surface at a first distance from a top surface of the work platform lower than a support surface of the pair of tread rollers at a second distance from the top surface of the work platform.

14 Claims, 3 Drawing Sheets

(56) References Cited

U.S. PATENT DOCUMENTS

| | | | |
|---|---|---|---|
| 2006/0169415 A1* | 8/2006 | Lawson et al. | 157/1.1 |
| 2007/0084275 A1* | 4/2007 | Gotou et al. | 73/146 |
| 2010/0263801 A1* | 10/2010 | Lawson et al. | 157/1.1 |
| 2011/0042015 A1* | 2/2011 | Lawson et al. | 157/1.17 |
| 2012/0260726 A1* | 10/2012 | Cuttino | 73/146 |

FOREIGN PATENT DOCUMENTS

| | | |
|---|---|---|
| JP | 02-038202 A | 2/1990 |
| JP | 05-089007 A | 4/1993 |
| JP | 2000-041804 A | 2/2000 |
| WO | 02/092365 A1 | 11/2002 |

OTHER PUBLICATIONS

Abstract and EPO machine translation of WO 02/092365 A1 obtained from http://translationportal.epo.org on Dec. 20, 2011, 4 pgs.

Abstract and EPO machine translation of FR 2 824 782 A1 obtained from http://translationportal.epo.org on Dec. 20, 2011, 3 pgs.

Abstract of EP 1 392 531 B1 obtained from http://worldwide.espacenet.com on Dec. 22, 2011, 1 pg.

* cited by examiner

FAST TRANSFER TIRE WORK STATION

This application is a National Stage application of International Application No. PCT/US2009/049159, filed Jun. 30, 2009, to which this application claims priority and the benefit of, the disclosure of which is also hereby incorporated by reference.

BACKGROUND OF THE INVENTION

1. Field of the Invention

The invention relates generally to tire work stations and more specifically to work stations for tire repair and inspection.

2. Description of the Related Art

It is common practice for tires to be visually inspected at the end of the manufacturing process and prior to any retread operations. These tires, particularly in the retread process, can be quite heavy and difficult to maneuver. Tire work stations may be necessary to assist in loading and unloading tires and achieving the appropriate work height for the individual operator. The operator may need the ability to maneuver the tire to gain access to all areas of the tire for inspection and potential repair procedures. Some tire work stations known in the art contain large platforms and bead spreaders for performing numerous operations that may restrict the movement of the operator. A simple, low cost work station with a small footprint that allows access to any size tire is needed.

SUMMARY OF THE INVENTION

Particular embodiments of the present invention include a tire work station for holding a tire having work performed thereon. The tire work station may comprise a work platform mounted to a vertically adjustable pedestal, the work platform having a first support system mounted thereto, the first support system adapted for holding the tire selectively in the side orientation, the first support system comprising a pair of tread rollers permitting rotation of the tire about its axis, each of the tread rollers rotating about a roller axis, inclined at a first inclined angle A1 with the work platform, the roller axis further forming a second angle A2 with a pair of sidewall rollers for supporting a sidewall of the tire, the sidewall rollers spaced apart to define a passageway for the tire in its front orientation and the work platform further having a second support system mounted between the pair of tread rollers, the second support system adapted for holding the tire selectively in the front orientation, the second support system comprising a tread support surface at a first distance from a top surface of the work platform lower than a support surface of the pair of tread rollers at a second distance from the top surface of the work platform.

Particular embodiments of the present invention may further include a system for using the tire work station. The system may comprise the tire work station as described above and a transportation system for moving the tire. The system may further include a tire repair process and/or a manufacturing process.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Embodiments of the present invention include a tire work station and a system for using the tire work station. It is advantageous having a tire work station capable of holding a tire at the appropriate level for an individual operator and allowing access by the operator to the inner areas of the tire. Other advantages of particular embodiments of the present invention may include the ability to rotate the tire on a set of rollers and to apply a brake to the rollers to lock the position of the tire. Another advantage may include the ability to inspect and/or repair a tire of a wide variety of sizes on the tire work station.

Figure 1:
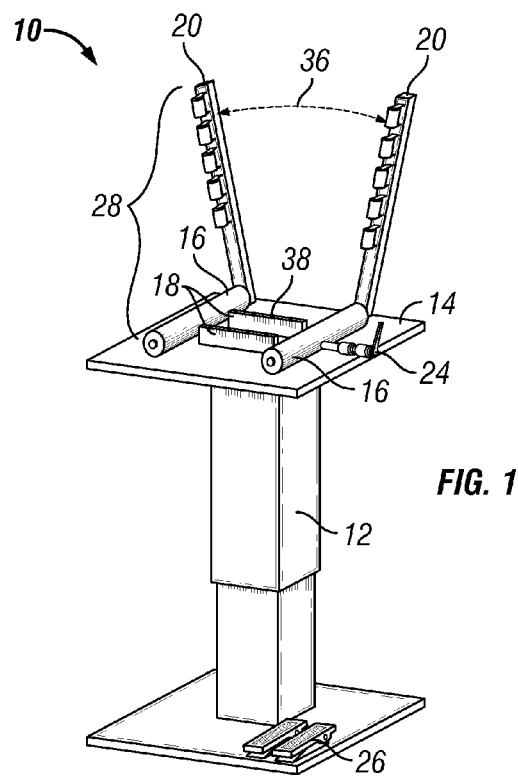
FIG. 1 is a perspective view of an exemplary tire work station in accordance with the present invention.

FIG. 1 is a perspective view of an exemplary tire work station in accordance with the present invention. Referring to FIG. 1, a tire work station 10 comprises a vertically adjustable pedestal 12, a work platform 14, a first support system 28, and a second support system 18. The tire work station 10 may be made of any durable material that will withstand the loading and unloading of tires.

The vertically adjustable pedestal 12 raises and lowers the work platform 14 between a working height and a loading/unloading height. The working height is the level at which an individual operator positions the work platform for greatest comfort and ease of access for the operator to inspect or repair the tire. The loading/unloading height is the height necessary to load and unload the tire onto any conveyor or monorail or other type of system being used. The vertically adjustable pedestal 12 may be capable of adjusting the work platform 14 height between an optimal operator working height and a loading/unloading height. As known by those skilled in the art any type of actuator may be used to achieve the movement of the platform, such as, for example, an air cylinder or a hydraulic cylinder. A particular embodiment of the pedestal may have operator controls 26, such as, for example, foot pedals, hand levers or a remote control device for effecting the raising and lowering of the work platform 14.

Figure 5:
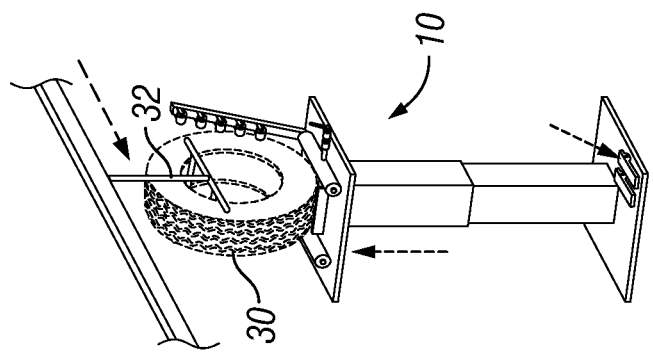
Figure 8:
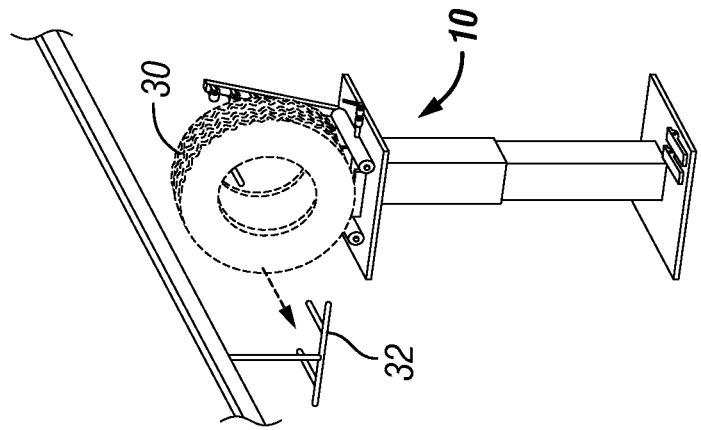

The work platform 14 mounts to the vertically adjustable pedestal 12 to provide a receiving surface for a tire to be inspected or repaired. The work platform may be large enough to support a tire in a front orientation and in a side orientation (as illustrated in FIGS. 5 and 8 respectively) but small enough to allow the operator easy access from all sides of the work platform 14. As shown in FIG. 5, the front orientation presents the tire with the tread facing the front edge of the work platform 14 and utilizes a second support system 18 to support the tire. As shown in FIG. 8, the side orientation presents the tire with the tire sidewall facing the front edge of the work platform 14 and utilizes the first support system to support the tire. In particular embodiments, the work platform measures, for example, between 20 inches and 30 inches long and between 10 inches and 20 inches wide.

An embodiment of the present invention contains a first support system 28 mounted on the work platform 14 for holding the tire selectively in the side orientation. Such a first support system 28 may include a pair of tread rollers 16 and a pair of sidewall rollers 20. The tread rollers 16 and the sidewall rollers 20 may be multiple rollers as shown in the exemplary embodiment illustrated in FIG. 1.

Figure 2:
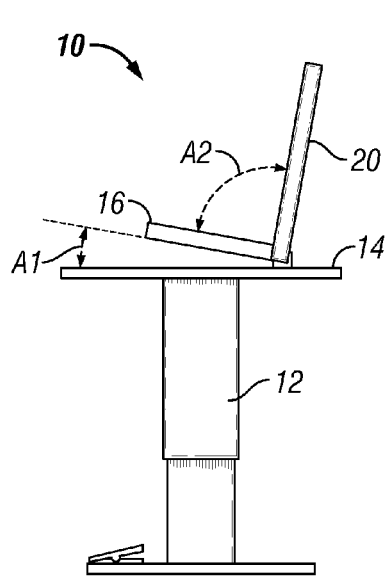
FIG. 2 is a side view of the exemplary tire work station shown in FIG. 1.

FIG. 2 is a side view of the exemplary tire work station shown in FIG. 1. The tread rollers 16 and the sidewall rollers 20 work together to support a tire in the side orientation. The tread rollers 16 may be slightly angled away from the work platform and toward the sidewall rollers 20 to encourage the tire to rest against the sidewall rollers 20. This first inclined angle A1 created between one end of the tread rollers 16 and the work platform 14 may be between 5° and 15°. A particular embodiment includes a first inclined angle A1 of 10° created between the tread rollers 16 and the work platform 14. The first inclined angle A1 causes the tire placed in the side orientation to lean against the sidewall rollers 20 providing operator access to the inside of the tire.

It is advantageous for the operator to have the ability to rotate the tire during the inspection and/or repair process. The tread rollers 16 allow for rotation of the tire about its axis. The tread rollers may allow rotation of the tire in a forward or backward rotation. The tread rollers rotate about a roller axis. The tread rollers 16 may have a brake mechanism 24 for stopping the movement of the roller and locking the position of the tire. The brake mechanism 24 may be any known mechanism for restricting movement of the tread roller.

As discussed, the first support system includes tread rollers 16 and sidewall rollers 20. In a particular embodiment the sidewall rollers 20 may be a pair of vertical extensions with multiple rollers rotating about the sidewall roller axis. The sidewall rollers allow for ease of positioning the tire on and off of the platform and rotating the tire. Multiple rollers may extend throughout the length of the vertical extensions or only populate a portion of the vertical extensions. This tire work station offers ergonomic and safety advantages, such as, for example, when loading/unloading and positioning the tire for inspection or repair.

Referring again to FIG. 1, the sidewall rollers 20 are spaced apart to define a passageway 36 for a tire in its front orientation. The tire may be brought, for example, on an overhead monorail system through the defined passageway 36 and then picked up by the work station. The sidewall rollers 20 are spaced sufficiently distant to allow large truck tires passage between the pair of sidewall rollers with the tire in a front orientation. The height of the sidewall rollers 20 should be sufficient to support the tire. The pair of sidewall rollers may be spaced, for example, between 450 mm to 900 mm apart to allow passage of tires between the pair of sidewall rollers. As in the illustrated embodiment, the pair of sidewall rollers may be angled away from each other to create a greater distance at the top of the sidewall rollers compared with the bottom of the sidewall rollers. In a particular embodiment of the present invention, the sidewall rollers are spaced about 500 mm from each other near the work platform and 850 mm apart at the end distant from the work platform.

The tread rollers 16 and sidewall rollers 20 work together as the first support system 28 to support the tire in a side orientation. As illustrated in FIG. 2, the roller axis of the pair of tread rollers forms a second angle A2 with the pair of sidewall rollers. In one embodiment, the sidewall rollers are perpendicular to the tread rollers 16 which are at a 10° angle from the work platform. The second angle A2 formed between the tread rollers and the sidewall rollers may be between 80° and 100°.

Another embodiment of the present invention contains a second support system 18 having a tread support surface 38. The second support system is mounted between the pair of tread rollers on the work platform. The second support system is adapted to hold the tire in the front orientation. In one embodiment the second support system 18 may be a pair of fins. In another embodiment the second support system may be a pair of second support rollers, each rotating about its second support roller axis. This embodiment of the second support system allows the tire to rotate about its axis. The second support system 18 holds the tire away from any debris on the work platform 14 but does not interfere with the rotation of the tire on the tread rollers when in the side orientation.

Figure 3:
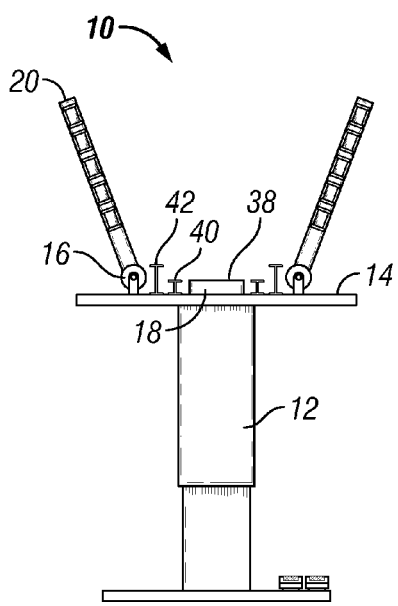
FIG. 3 is a front view of the exemplary tire work station shown in FIG. 1.

FIG. 3 is a front view of the exemplary tire work station shown in FIG. 1. The second support system 18 has a tread support surface 38 that is at a first distance 40. The first distance 40 is measured from the top surface of the work platform to the tread support surface 38. The first distance 40 is lower than the second distance 42. The second distance 42 is measured from the top surface of the work platform to a support surface of the pair of tread rollers. Thus, the second support system does not interfere with the rotation of the tire when in the side orientation being supported by the first support system 28.

Particular embodiments of the present invention include a system for repair or inspection of a tire. The system may comprise any of the embodiments of the tire work station and a transportation system, such as, for example, a monorail or conveyor system. The transportation system provides transport of the tires to and from the tire work station. The tire work station provides ergonomic advantages such as raising the work platform to accept the tire directly from the transportation system hook then lowering to an optimal working height for the operator. The tire work station may also be used to turn the tire around and maneuver its position. The tire work station may offer productivity improvement by reducing time for loading and unloading the tire from a transportation system and turning the tire to change its presentation to a further process. For example, a particular side of the tire may need to be presented for a grinding process.

Figure 4:
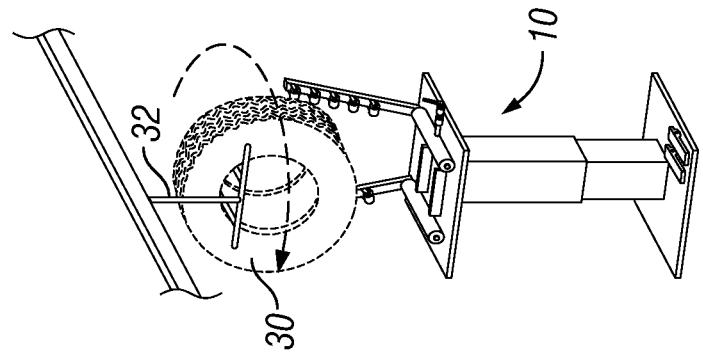
FIGS. 4-9 are perspective views of the exemplary tire work station shown in FIG. 1 in use.
Figure 6:
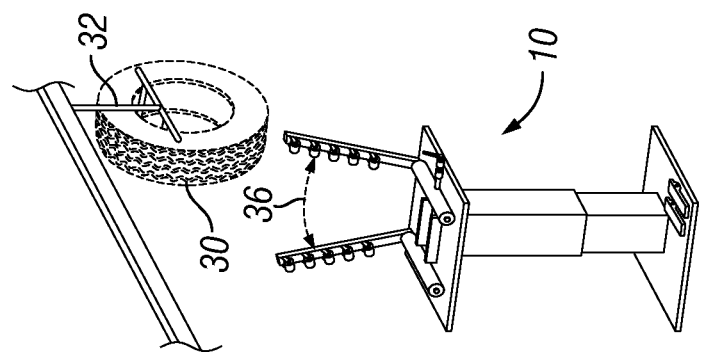
Figure 9:
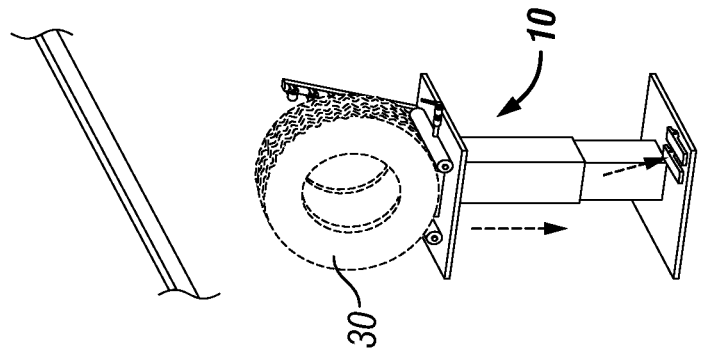
Figure 7:
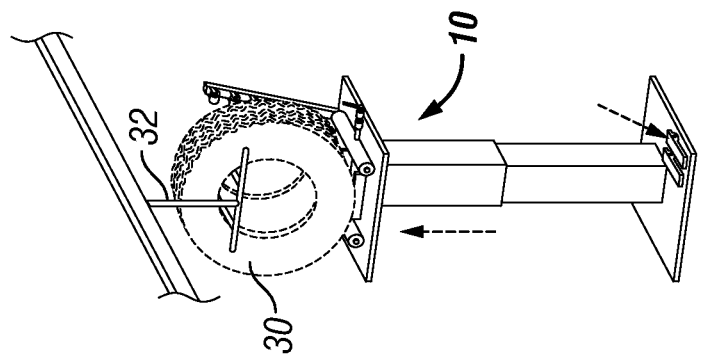

FIGS. 4-9 illustrate the use of the tire work station with a transportation system. The transportation system may include a hook 32 or other known mechanism to bring the tire 30 to the tire work station 10. In FIG. 4, a tire is being brought to the tire work station in the front orientation. The hook 32 brings the tire through the tire passageway 36. In FIG. 5, the platform is raised to accept the tire. The second support system receives the tire in the front orientation. The hook 32 may swivel to place the tire 30 in a side orientation as shown in FIG. 6 or the tire work station may be used to switch the hook placement to the other side of the tire. Thus, changing the side of the tire that is presented to the next process or station. In FIG. 7, the tire work station 10 is raised to the tire loading/unloading level and the first support system receives the tire from the hook. In FIG. 8, the hook 32 is removed from the tire 30. Then the tire work station 10 is lowered to the appropriate work height for the individual operator as shown in FIG. 9. The orientation of the hook 32 may be changed to the other side of the tire 30 to gain improved access to a particular area of the tire or change the side of the tire that is presented to the next process or station.

The system for repair or inspection of a tire may include a repair process, such as for example, a grinding operation or patch placement. The system may be used in a tire retread operation where there are multiple tire work stations, each designated for a separate task or for combined tasks. The system may also be used in conjunction with the manufacturing process as one or many tire work stations for inspection. The tire work station may be mounted into an existing system with minimal disturbance to the existing configuration.

The terms "comprising," "including," and "having," as used in the claims and specification herein, shall be considered as indicating an open group that may include other elements not specified. The term "consisting essentially of,"

as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A tire work station for holding a tire having work performed thereon, the tire selectively held in a side orientation or a front orientation, the tire work station comprising:
    a work platform mounted to a vertically adjustable pedestal, the work platform having a first support system mounted thereto, the first support system adapted for holding the tire selectively in the side orientation, the first support system comprising a pair of tread rollers permitting rotation of the tire about its axis, each of the tread rollers rotating about a roller axis, inclined at a first inclined angle A1 with the work platform, the roller axis further forming a second angle A2 with a pair of sidewall rollers for supporting a sidewall of the tire, the sidewall rollers spaced apart to define a passageway for the tire in its front orientation; and
    the work platform further having a second support system mounted between the pair of tread rollers, the second support system adapted for holding the tire selectively in the front orientation, the second support system comprising a tread support surface at a first distance from a top surface of the work platform lower than a support surface of the pair of tread rollers at a second distance from the top surface of the work platform.

2. The tire work station of claim 1, wherein at least one of the tread rollers has a brake.

3. The tire work station of claim 1, wherein the first inclined angle A1 is between 5° and 15°.

4. The tire work station of claim 3, wherein the first inclined angle A1 is 10°.

5. The tire work station of claim 1, wherein the second support system comprises a pair of fins.

6. The tire work station of claim 1, wherein the second support system comprises a pair of second support rollers.

7. The tire work station of claim 1, wherein the second angle A2 is between 80° and 100°.

8. The tire work station of claim 7 wherein the second angle A2 is 90°.

9. The tire work station of claim 1, further comprising foot pedals for raising and lowering the work platform.

10. A system for repair or inspection of a tire, the system comprising:
    the tire work station of claim 1; and
    a transportation system for moving the tire.

11. The system of claim 10, further comprising a tire repair process.

12. The system of claim 10, further comprising a manufacturing process.

13. The system of claim 10, further comprising a tire inspection process.

14. The system of claim 10, wherein the transportation system is a monorail.

\* \* \* \* \*